US011152835B2

(12) United States Patent
Kato et al.

(10) Patent No.: US 11,152,835 B2
(45) Date of Patent: Oct. 19, 2021

(54) ELECTRIC ACTUATOR WITH BUS BAR HOLDER

(71) Applicant: NIDEC TOSOK CORPORATION, Kanagawa (JP)

(72) Inventors: Shun Kato, Kanagawa (JP); Youngdae Kang, Kanagawa (JP); Hiroaki Takahashi, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 171 days.

(21) Appl. No.: 16/579,876

(22) Filed: Sep. 24, 2019

(65) Prior Publication Data
US 2020/0099270 A1     Mar. 26, 2020

(30) Foreign Application Priority Data

Sep. 26, 2018    (JP) .............................. JP2018-180442

(51) Int. Cl.
| | |
|---|---|
| *H02K 5/22* | (2006.01) |
| *F16H 61/32* | (2006.01) |
| *H02K 7/116* | (2006.01) |
| *F16H 57/02* | (2012.01) |

(52) U.S. Cl.
CPC ............. *H02K 5/225* (2013.01); *F16H 61/32* (2013.01); *H02K 7/116* (2013.01); *F16H 2057/02073* (2013.01); *H02K 2203/09* (2013.01)

(58) Field of Classification Search
CPC .... H02K 5/225; H02K 7/116; H02K 2203/09; H02K 3/522; F16H 61/32; F16H 2057/02073; F16H 61/0003; F16H 61/0006

USPC ............................................ 310/68 R, 71, 89
See application file for complete search history.

(56) References Cited

U.S. PATENT DOCUMENTS

| | | | | |
|---|---|---|---|---|
| 8,136,623 | B2 * | 3/2012 | Takashima | H02K 11/33 180/444 |
| 8,816,551 | B2 * | 8/2014 | Oishi | H02K 15/02 310/71 |
| 9,080,670 | B2 * | 7/2015 | Komatsu | F16H 63/3458 |
| 10,715,003 | B2 * | 7/2020 | Uematsu | F16H 61/0006 |
| 2009/0250287 | A1 * | 10/2009 | Takashima | H02K 11/33 180/444 |
| 2012/0067153 | A1 * | 3/2012 | Komatsu | F16H 63/3458 74/473.12 |

(Continued)

FOREIGN PATENT DOCUMENTS

JP       2012067818       4/2012

*Primary Examiner* — John K Kim
(74) *Attorney, Agent, or Firm* — JCIPRNET (57) ABSTRACT

An electric actuator includes a motor portion, a circuit board, a speed reduction mechanism, a busbar holder that holds a busbar, and a housing. The housing has a motor case and a compartmental wall. The compartmental wall has a through-hole which penetrates the compartmental wall in an axial direction. The busbar holder has a base portion and a projecting portion which projects from the base portion in the axial direction and is disposed in the through-hole. An end portion of the busbar at one side projects from the busbar holder toward one side in the axial direction and is connected to the circuit board, and an end portion of the busbar at the other side projects into the through-hole from a side surface of the projecting portion of the busbar holder and is connected to a coil of a stator.

5 Claims, 5 Drawing Sheets

(56) References Cited

U.S. PATENT DOCUMENTS

| | | | |
|---|---|---|---|
| 2014/0077638 A1* | 3/2014 | Nakai | H02K 3/50 |
| | | | 310/71 |
| 2014/0091683 A1* | 4/2014 | Ito | H02K 11/38 |
| | | | 310/68 R |
| 2015/0236570 A1* | 8/2015 | Hayashi | H02K 11/33 |
| | | | 310/45 |
| 2020/0099270 A1* | 3/2020 | Kato | F16H 61/0003 |

\* cited by examiner

ELECTRIC ACTUATOR WITH BUS BAR HOLDER

CROSS-REFERENCE TO RELATED APPLICATION

This application claims the priority benefit of Japan Patent Application No. 2018-180442, filed on Sep. 26, 2018. The entirety of the above-mentioned patent application is hereby incorporated by reference herein and made a part of this specification.

BACKGROUND OF THE DISCLOSURE

Technical Field

The disclosure relates to an electric actuator.

Related Art

An electric actuator is known which includes a motor portion, a speed reduction mechanism coupled to the motor portion, and an output portion to which rotation of the motor portion is transmitted via the speed reduction mechanism. For example, Patent literature discloses an electric actuator that is arranged in a power transmitting apparatus for a vehicle.

LITERATURE OF RELATED ART

Patent Literature

[Patent literature 1] Japanese Laid-Open No. 2012-067818

As disclosed in Patent literature 1, in an electric actuator in which a drive circuit is internally arranged in a case, it is necessary to connect the motor and the drive circuit in the case. However, it is difficult to position a front end of a leader wire extending from a coil of the motor. Therefore, work for fixing the leader wire to a board equipped with the drive circuit is complicated. On the other hand, when a busbar that performs relaying between the coil and the board is arranged in order to simplify connecting work, it is difficult to reduce a size of the electric actuator.

SUMMARY

An electric actuator according to an aspect of the disclosure includes: a motor portion having a motor shaft which extends in an axial direction and a stator which is disposed at an outer side in a radial direction from the motor shaft; a circuit board that is positioned at one side in the axial direction of the motor portion; a speed reduction mechanism that is coupled to the other side of the motor shaft in the axial direction; a busbar that electrically connects the stator and the circuit board to each other; a busbar holder that holds the busbar; and a housing that accommodates the motor portion, the speed reduction mechanism, the circuit board, the busbar, and the busbar holder. The housing has a motor case that accommodates the stator in a tubular part which extends in the axial direction, and a compartmental wall which is positioned between the motor case and the circuit board and expands in a direction intersecting with the axial direction. The compartmental wall has a through-hole which penetrates the compartmental wall in the axial direction. The busbar holder has a base portion being plate-shaped which expands in a direction intersecting with the axial direction, and a projecting portion which projects from the base portion in the axial direction and is disposed in the through-hole. An end portion of the busbar at one side projects from the busbar holder toward the one side in the axial direction and is connected to the circuit board. An end portion of the busbar at the other side projects into the through-hole from a side surface of the projecting portion of the busbar holder and is connected to a coil of the stator.

DESCRIPTION OF THE EMBODIMENTS

According to the aspect of the disclosure, an electric actuator is provided in which a casing is inhibited from increasing in size and assembly workability is improved.

In the drawings, a Z-axial direction is an up-down direction in which a positive side is an upper side and a negative side is a lower side. An axial direction of a central axis J1 which is a virtual axis appropriately illustrated in the drawings is parallel to the Z-axial direction, that is, the up-down direction. In the following description, a direction parallel to the axial direction of the central axis J1 is simply referred to as an "axial direction Z". In addition, unless otherwise described, a radial direction with the central axis J1 as a center is simply referred to as a "radial direction"", and a circumferential direction with the central axis J1 as a center is simply referred to as a "circumferential direction".

In the embodiment, the upper side corresponds to one side in the axial direction. In the embodiment, a plan view means that observation is performed from above or below in the axial direction. Moreover, the upper side and the lower side are merely terms for describing a relative positional relationship between structural elements, and an actual arrangement relationship or the like may be an arrangement relationship or the like other than the arrangement relationship or the like described by these terms.

Figure 1:
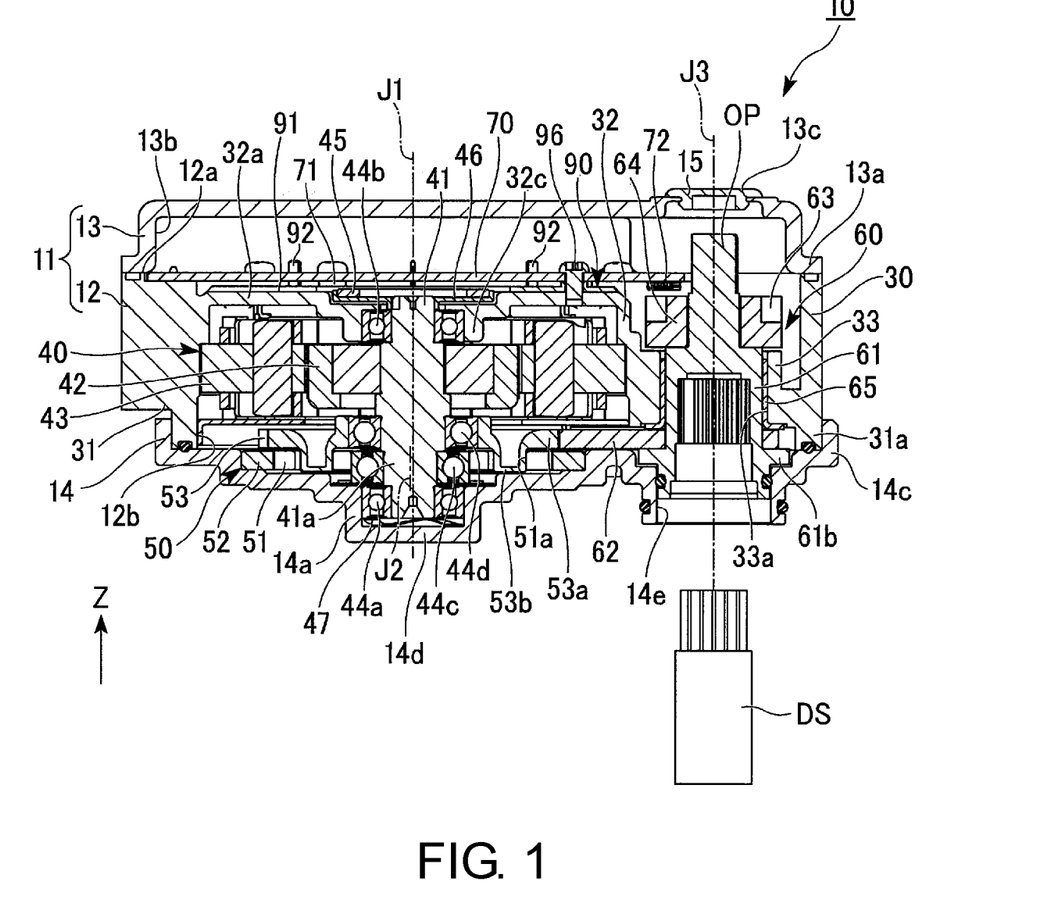
FIG. 1 is a cross-sectional view of an electric actuator of an embodiment.

An electric actuator 10 of the embodiment illustrated in FIGS. 1 to 5 is attached to a vehicle. More specifically, the electric actuator 10 is mounted on a shift-by-wire type actuator device that is driven based on a shift operation by a driver of the vehicle. As illustrated in FIG. 1, the electric actuator 10 includes a motor portion 40, a speed reduction mechanism 50, an output portion 60, a circuit board 70, a busbar unit 90, and a housing 11.

The motor portion 40 has a motor shaft 41, a first bearing 44a, a second bearing 44b, a third bearing 44c, a fourth bearing 44d, a rotor body 42, a stator 43, a sensor magnet for motor portion 45, and a magnet holder 46. The motor shaft 41 extends in the axial direction Z.

The first bearing 44a, the second bearing 44b, the third bearing 44c, and the fourth bearing 44d support the motor shaft 41 so that motor shaft 41 is capable of rotating around the central axis J1. In the embodiment, the first bearing 44a, the second bearing 44b, the third bearing 44c, and the fourth bearing 44d are ball bearings, for example.

An eccentric shaft portion 41a being a portion of the motor shaft 41 which is supported by the third bearing 44c has a columnar shape that is parallel to the central axis J1 and extends with an eccentric axis J2 as a center, the eccentric axis J2 being eccentric with respect to the central axis J1. A portion of the motor shaft 41 apart from the eccentric shaft portion 41a has a columnar shape that extends with the central axis J1 as a center.

The rotor body 42 is fixed to the motor shaft 41. The rotor body 42 includes a rotor core which is fixed to the motor shaft 41 and a rotor magnet which is fixed to an outer circumferential portion of the rotor core.

The stator 43 is disposed at an outer side in the radial direction from the rotor body 42 via a gap. The stator 43 has a ring shape that surrounds the rotor body 42 at the outer side in the radial direction. The stator 43 has, for example, a stator core, a plurality of insulators, and a plurality of coils. The coils are installed on teeth of the stator core via the insulators, respectively.

The magnet holder 46 has an annular shape centered on the central axis J1. The magnet holder 46 is fixed to an outer circumferential surface of an upper end portion of the motor shaft 41. The sensor magnet for motor portion 45 has an annular plate shape centered on the central axis J1. A plate surface of the sensor magnet for motor portion 45 is orthogonal to the axial direction Z. The sensor magnet for motor portion 45 is fixed to an outer circumferential edge portion of a top surface of the magnet holder 46 in the radial direction. Accordingly, the sensor magnet for motor portion 45 is attached to the motor shaft 41 via the magnet holder 46. In the embodiment, the sensor magnet for motor portion 45 faces a lower surface of the circuit board 70 via a gap in the up-down direction.

The speed reduction mechanism 50 is coupled to the motor shaft 41 at the lower side. The speed reduction mechanism 50 is disposed below the rotor body 42 and the stator 43. The speed reduction mechanism 50 has an external gear 51, an internal gear 52, and an output gear 53. Moreover, the speed reduction mechanism 50 may be coupled to the motor shaft 41 at the upper side.

The external gear 51 has an annular plate shape expanding in a radial direction of the eccentric axis J2 with the eccentric axis J2 of the eccentric shaft portion 41a as a center. A gear portion is arranged at an outer surface of the external gear 51 in the radial direction. The external gear 51 is connected to the motor shaft 41 via the third bearing 44c. Accordingly, the speed reduction mechanism 50 is coupled to the motor shaft 41. The external gear 51 is fitted into an outer ring of the third bearing 44c from an outer side in the radial direction. Accordingly, the third bearing 44c couples the motor shaft 41 and the external gear 51 to each other so that the motor shaft 41 and the external gear 51 are capable of rotating relatively around the eccentric axis J2.

The external gear 51 has a plurality of holes 51a that penetrates the external gear 51 in the axial direction Z. The plurality of holes 51a is disposed at equal intervals over a circumference along the circumferential direction with the eccentric axis J2 as a center. The hole 51a has a circular shape when viewed in the axial direction Z.

The internal gear 52 surrounds the outer side of the external gear 51 in the radial direction. A gear portion of the internal gear 52 intermeshes with the gear portion of the external gear 51. The internal gear 52 has an annular shape centered on the central axis J1. An outer circumferential portion of the internal gear 52 has a polygonal shape such as a regular dodecagonal shape and is fixed in a state that rotation of the internal gear is stopped by a second lid member 14 described later.

The output gear 53 has a main output-gear body 53a and a plurality of pins 53b. The main output-gear body 53a is disposed below the external gear 51 and the internal gear 52. The main output-gear body 53a has an annular plate shape expanding in the radial direction with the central axis J1 as a center. A gear portion is arranged at an outer surface of the main output-gear body 53a in the radial direction. The main output-gear body 53a is connected to the motor shaft 41 via the fourth bearing 44d.

The plurality of pins 53b has a cylindrical shape projecting upward from a top surface of the main output-gear body 53a. The plurality of pins 53b is disposed at equal intervals over a circumference along the circumferential direction. An outer diameter of the pin 53b is smaller than an inner diameter of the hole 51a. The plurality of pins 53b passes through the plurality of holes 51a from the upper side, respectively. An outer circumferential surface of the pin 53b is inscribed in an inner circumferential surface of the hole 51a. The inner circumferential surface of the hole 51a supports the external gear 51 via the pin 53b so that the external gear 51 is capable of oscillating around the central axis J1.

The output portion 60 is a portion that outputs a drive force of the electric actuator 10. The output portion 60 is disposed at an outer side in the radial direction from the motor portion 40. The output portion 60 has an output shaft 61, a drive gear 62, a sensor magnet for output portion 63, and a magnet holder 64.

The output shaft 61 has a tubular shape extending in the axial direction Z. In this manner, the output shaft 61 extends in the same direction as the motor shaft 41, and thus a structure of the speed reduction mechanism 50 that transmits rotation of the motor shaft 41 to the output shaft 61 can be simplified. In the embodiment, the output shaft 61 has a cylindrical shape centered on an output central axis J3. The output central axis J3 is parallel to the central axis J1 and is disposed to be separated from the central axis J1 in the radial direction. In other words, the motor shaft 41 and the output shaft 61 are disposed to be separated from each other in the radial direction of the motor shaft 41.

The output shaft 61 is open at the lower side. The output shaft 61 has a spline groove on an inner circumferential surface. The output shaft 61 is disposed at a position overlapping the rotor body 42 in the radial direction of the motor shaft 41. A driven shaft DS is inserted from the lower side to be coupled to the output shaft 61. More specifically, a spline portion arranged at an outer circumferential surface of the driven shaft DS is fitted into the spline groove arranged in the inner circumferential surface of the output shaft 61, and thereby the output shaft 61 and the driven shaft DS are coupled to each other. A drive force of the electric actuator 10 is transmitted to the driven shaft DS via the output shaft 61. Accordingly, the electric actuator 10 rotates the driven shaft DS around the output central axis J3.

The drive gear 62 is fixed to the output shaft 61 and intermeshes with the output gear 53. In the embodiment, the drive gear 62 is fixed to an outer circumferential surface of the output shaft 61. The drive gear 62 extends from the output shaft 61 toward the output gear 53. The drive gear 62 is a fan-shaped gear in a plan view. A gear portion is arranged at an end portion of the drive gear 62 at a side of the output gear 53. The gear portion of the drive gear 62 intermeshes with the gear portion of the output gear 53.

The magnet holder 64 is a member having a substantially cylindrical shape which extends in the axial direction Z with the output central axis J3 as a center. The magnet holder 64 is open at both sides in the axial direction. The magnet holder 64 is fixed to an upper portion of the output shaft 61. In the case of the embodiment, the magnet holder 64 is disposed at the outer side in the radial direction from the fourth bearing 44*d* of the motor portion 40. The magnet holder 64 partially overlaps the circuit board 70 when viewed in the axial direction Z. The magnet holder 64 is disposed below the circuit board 70. An upper end portion of the output shaft 61 penetrates the magnet holder 64 in the axial direction Z and is press-fitted therein.

The sensor magnet for output portion 63 has an annular shape centered on the output central axis J3. The sensor magnet for output portion 63 is fixed to an outer circumferential portion of a top surface of the magnet holder 64. By fixing the magnet holder 64 to the output shaft 61, the sensor magnet for output portion 63 is fixed to the output shaft 61 via the magnet holder 64. The sensor magnet for output portion 63 faces a lower surface of the circuit board 70 via a gap.

The upper end portion of the output shaft 61 projects toward the upper side of the magnet holder 64. The upper end portion of the output shaft 61 passes by a side end surface of the circuit board 70 and projects toward the upper side above the circuit board 70. An operation portion OP into which a tool can be fitted is arranged at the upper end portion of the output shaft 61. For example, the operation portion OP has a quadrangular-column shape or a hexagonal-column shape extending along the output central axis J3.

When the motor shaft 41 is rotated around the central axis J1, the eccentric shaft portion 41*a* revolves with the central axis J1 as a center in the circumferential direction. Revolution of the eccentric shaft portion 41*a* is transmitted to the external gear 51 via the third bearing 44*c*, and the external gear 51 oscillates while an inscribed position of the outer circumferential surface of the pin 53*b* in the inner circumferential surface of the hole 51*a* changes. Accordingly, an intermeshing position of the gear portion of the external gear 51 with the gear portion of the internal gear 52 changes in the circumferential direction. Hence, a rotating force of the motor shaft 41 is transmitted to the internal gear 52 via the external gear 51.

Here, in the embodiment, the internal gear 52 is fixed and thus does not rotate. Therefore, the external gear 51 rotates around the eccentric axis J2 due to a reaction force of the rotating force transmitted to the internal gear 52. In this case, a rotating orientation of the external gear 51 is opposite to a rotating orientation of the motor shaft 41. The rotation of the external gear 51 around the eccentric axis J2 is transmitted to the output gear 53 via the holes 51*a* and the pins 53*b*. Accordingly, the output gear 53 rotates around the central axis J1. The rotation of the motor shaft 41 is decelerated and transmitted to the output gear 53.

When the output gear 53 rotates, the drive gear 62 intermeshing with the output gear 53 rotates around the output central axis J3. Accordingly, the output shaft 61 fixed to the drive gear 62 rotates around the output central axis J3. In this manner, the rotation of the motor shaft 41 is transmitted to the output shaft 61 via the speed reduction mechanism 50.

The circuit board 70 is disposed at the upper side above the motor portion 40 and the output portion 60. The circuit board 70 has a plate shape in which a board surface thereof is orthogonal to the axial direction Z. The circuit board 70 has a substantially square shape when viewed in the axial direction Z. The circuit board 70 is electrically connected to the coils of the stator 43 via a busbar unit 90 described later. In other words, the circuit board 70 is electrically connected to the motor portion 40.

The motor-portion sensor 71 is fixed to an undersurface of the circuit board 70. More specifically, the motor-portion sensor 71 is fixed to a portion of the lower surface of the circuit board 70, the portion facing the sensor magnet for motor portion 45 via a gap in the axial direction Z. The motor-portion sensor 71 is a magnetic sensor that detects a magnetic field of the sensor magnet for motor portion 45. The motor-portion sensor 71 is a Hall element, for example. In the embodiment, three motor-portion sensors 71 are arranged along the circumferential direction. The motor-portion sensor 71 detects the magnetic field of the sensor magnet for motor portion 45, thereby detecting a rotational position of the sensor magnet for motor portion 45 to detect the rotation of the motor shaft 41.

The output-portion sensor 72 is fixed to the undersurface of the circuit board 70. More specifically, the output-portion sensor 72 is fixed to a portion of the lower surface of the circuit board 70, the portion facing the sensor magnet for output portion 63 via a gap in the axial direction Z. The output-portion sensor 72 is a magnetic sensor that detects a magnetic field of the sensor magnet for output portion 63. The output-portion sensor 72 is a Hall IC, for example. The output-portion sensor 72 detects the magnetic field of the sensor magnet for output portion 63, thereby detecting a rotational position of the sensor magnet for output portion 63 to detect the rotation of the output shaft 61.

The housing 11 accommodates the motor portion 40, the speed reduction mechanism 50, the output portion 60, the circuit board 70, and the busbar unit 90. The housing 11 has a housing body 12 having a polygonal shape in a plan view and being open at the upper side, a first lid member 13 which is fixed to an opening portion 12*a* of the housing body 12 at the upper side, and the second lid member 14 which is fixed to an opening portion 12*b* of the housing body 12 at the lower side.

The housing body 12 has an outer wall portion 30 having an angled-tubular shape which configures a casing of the electric actuator 10, a bottom wall portion 31 expanding inward in the radial direction from a lower end portion of the outer wall portion 30, and a motor case 32 and an output-shaft holder 33 which are fixed to the bottom wall portion 31. In the embodiment, the outer wall portion 30 has a pentagonal-tubular shape when viewed in the axial direction Z. The opening portion of the outer wall portion 30 at the upper side is the opening portion 12*a* of the housing body 12 at the upper side. The bottom wall portion 31 has an opening portion which is open at the lower side. A tubular wall 31*a* having a tube shape projecting downward from the bottom wall portion 31 is arranged at a circumferential edge of the opening portion of the bottom wall portion 31. The opening portion surrounded by the cylindrical wall 31*a* is the opening portion 12*b* of the housing body 12 at the lower side. The motor case 32 and the output-shaft holder 33 are fixed to a top surface of the bottom wall portion 31.

The motor case 32 has a tubular shape which is open at both the upper and lower sides. The motor case 32 internally holds the motor portion 40. The housing body 12 has a compartmental wall 32*a* having an annular plate shape expanding inward in the radial direction from an end portion of an upper opening of the motor case 32. A direction in which the compartmental wall 32*a* expands is not limited to the radial direction and may be a direction intersecting with the axial direction Z. In the case of the embodiment, the motor case 32 and the compartmental wall 32a are a part of a single member. The motor case 32 and the compartmental wall 32a may also be independent members. A lower end of the motor case 32 is fixed to the bottom wall portion 31. The stator 43 of the motor portion 40 is fixed to an inner circumferential surface of the motor case 32.

Figure 4:
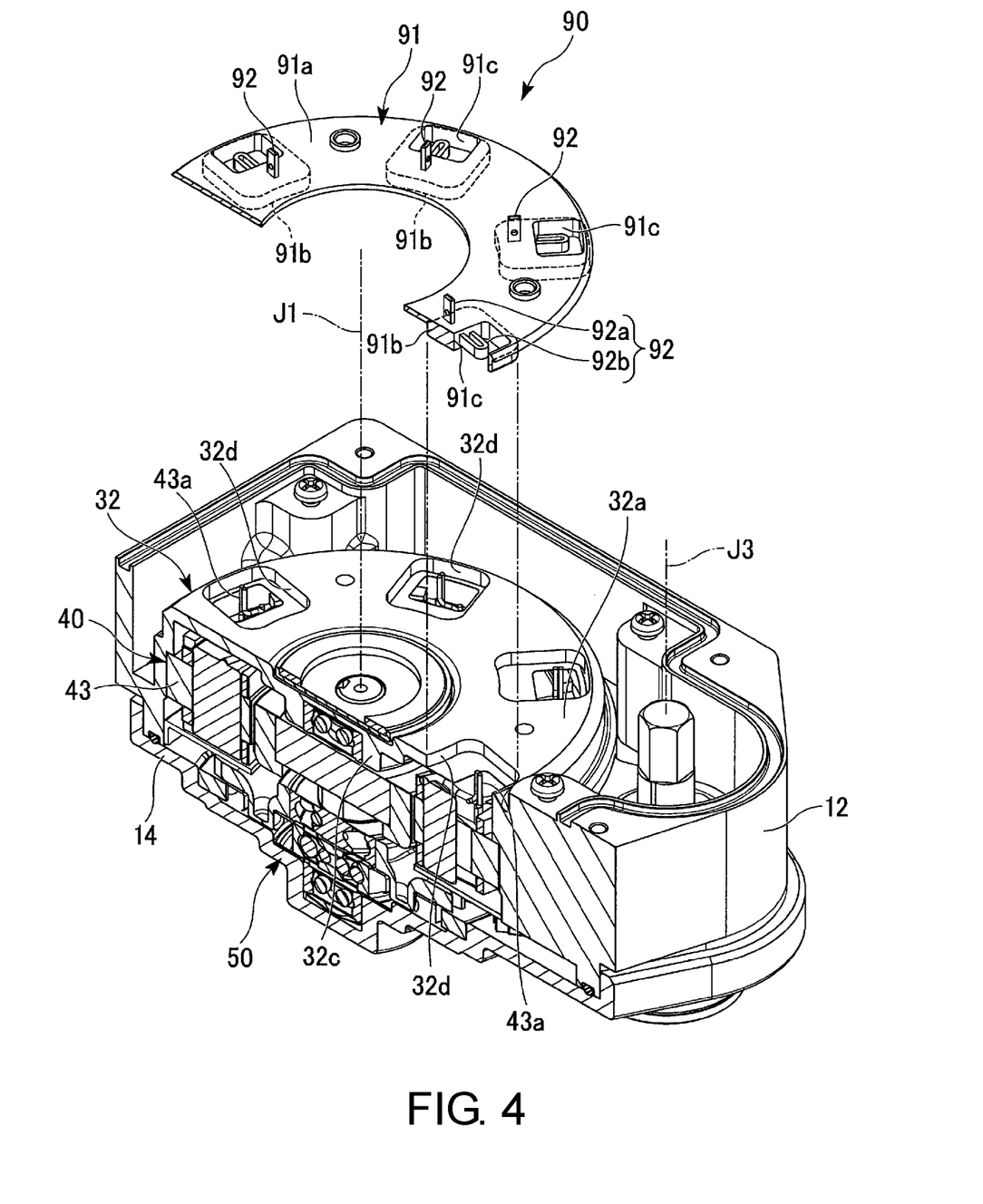
FIG. 4 is a perspective view of the electric actuator including a partial cross-section.
Figure 5:
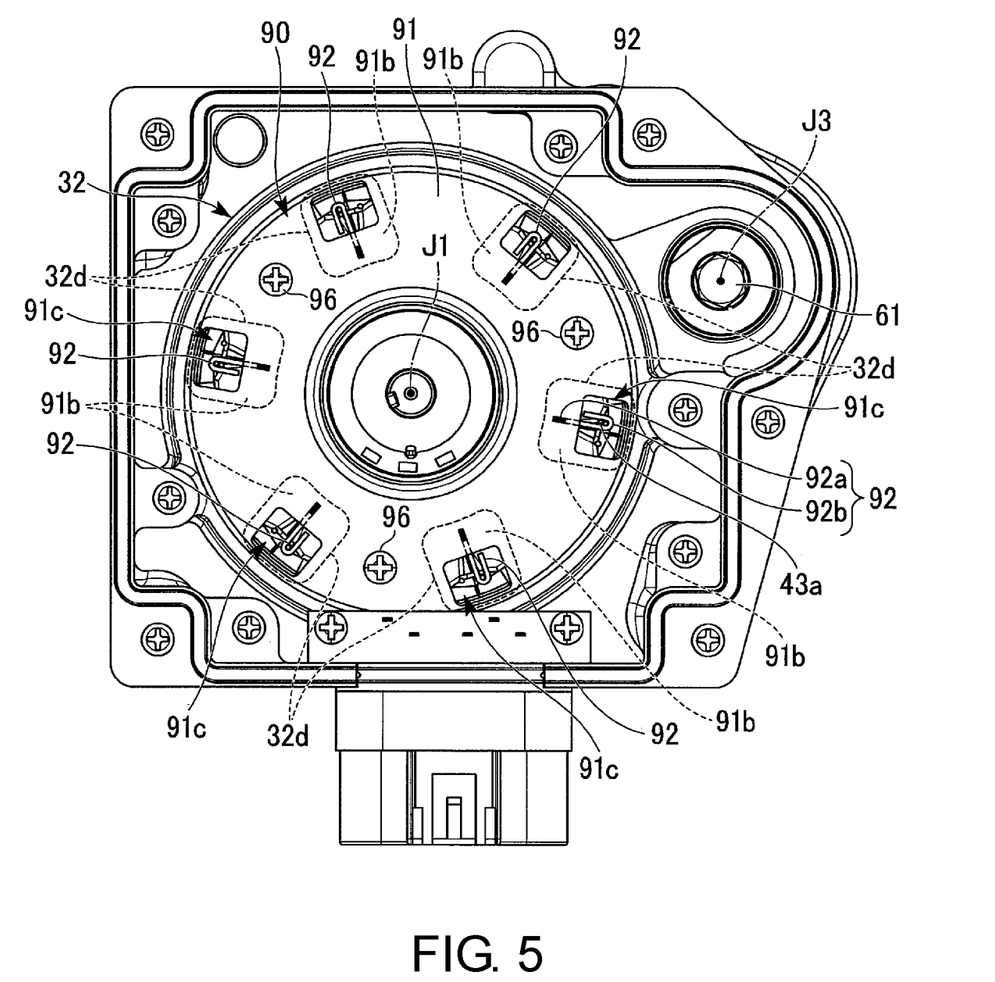
FIG. 5 is a plan view of the electric actuator illustrating a state in which a busbar holder is exposed.

As illustrated in FIGS. 4 and 5, the compartmental wall 32a has six through-holes 32d that penetrate the compartmental wall 32a in the up-down direction (axial direction Z). The through-holes 32d have a corner-rounded quadrangular shape. The six through-holes 32d are disposed at the same positions as each other in the radial direction when viewed in the axial direction Z and are disposed at equal intervals in the circumferential direction around the central axis J1.

The compartmental wall 32a has a bearing holder 32c at a center when viewed in the axial direction Z. The bearing holder 32c has a cylindrical shape extending in the axial direction Z. An inner circumferential surface of the bearing holder 32c holds the second bearing 44b. In other words, the compartmental wall 32a expands inward in the radial direction from an end portion of the motor case 32 at the upper side (one side in the axial direction) and holds the second bearing 44b which supports the motor shaft 41, at a central portion when viewed in the axial direction Z. The compartmental wall 32a also serves as a bearing holder, thereby being capable of inhibiting size increase of the electric actuator 10 in the axial direction Z.

The busbar unit 90 is disposed at a top surface of the compartmental wall 32a. As illustrated in FIGS. 2 to 5, the busbar unit 90 has a busbar holder 91 having an annular plate shape and six busbars 92 which are held by the busbar holder 91. The busbar holder 91 has a base portion 91a having an annular plate shape expanding in a direction intersecting with the axial direction Z and six projecting portions 91b which project downward from an undersurface of the base portion 91a.

The six projecting portions 91b are disposed at equal intervals along the circumferential direction around the central axis J1. The external appearance of the projecting portion 91b is a corner-rounded quadrangular shape when viewed in the axial direction Z. The busbar holder 91 has a through-hole 91c that penetrates the busbar holder 91 in the axial direction Z. The external shape of the through-hole 91c is a corner-rounded quadrangular shape. The through-hole 91c is positioned at a portion of the projecting portion 91b nearer the outer side in the radial direction when viewed in the axial direction.

The busbars 92 are held by the busbar holder 91. In the case of the embodiment, the busbars 92 are formed by insert molding at the busbar holder 91. Both end portions of each of the busbars 92 are exposed from the busbar holder 91. Specifically, an end portion 92a of the busbar 92 at one side projects upward from a top surface of the busbar holder 91. In the embodiment, the end portion 92a of the busbar 92 at one side has a straight ribbon shape extending in the up-down direction and penetrates the circuit board 70 from the lower side toward the upper side. The end portion 92a is electrically connected to the circuit board 70 at a position, at which the end portion 92a penetrates the circuit board 70, by a connecting method such as soldering, welding or press fitting.

An end portion 92b of the busbar 92 at the other side projects into the through-hole 91c from a side surface of the projecting portion 91b of the busbar holder 91. In the case of the embodiment, the end portion 92b of the busbar 92 at the other side projects outward in the radial direction from an inner wall positioned at an inner side of the through-hole 91c in the radial direction. The end portion 92b has a shape of being bent into a hook shape in the through-hole 91c. The end portion 92b grips the coil 43a of the stator 43 and is connected to the coil 43a by soldering or welding in the through-hole 91c. Accordingly, the stator 43 and the circuit board 70 are electrically connected to each other via the busbar 92.

In a state that the busbar unit 90 is attached to the compartmental wall 32a, the six projecting portions 91b are inserted into the six through-holes 32d of the compartmental wall 32a, respectively. In the case of the embodiment, the external shape of the projecting portion 91b is substantially identical with a shape of an inner circumference of the through-hole 32d, and by inserting the projecting portion 91b into the through-hole 32d, the busbar unit 90 is positioned with respect to the compartmental wall 32a in the circumferential direction and the radial direction.

The through-hole 32d of the compartmental wall 32a is partially blocked by the busbar holder 91 when viewed in the axial direction Z. The through-hole 91c of the busbar holder 91 is open in a flat-surface region of the through-hole 32d. An internal space of the motor case 32 is connected to an upper space of the busbar unit 90 via the through-hole 91c of the busbar holder 91.

In the embodiment, the through-hole 91c is positioned at the inner side from an outer circumferential edge of the projecting portion 91b when viewed in the axial direction. In other words, four sides of the through-hole 91c are surrounded by a wall portion configured of a part of the projecting portion 91b. According to this configuration, the projecting portion 91b which is a part of the busbar holder 91 made of resin surrounds the end portion 92b of the busbar 92, and thus the busbar 92 and the compartmental wall 32a are inhibited from coming into contact with each other. When the compartmental wall 32a is made of metal, a short circuit is unlikely to occur between the busbar 92 and the compartmental wall 32a.

In addition, when viewed in the axial direction, four outer surfaces of the projecting portion 91b and four inner wall surfaces of the through-hole 32d can be disposed to come into contact with each other or to approach each other, and the projecting portion 91b can be fitted into the through-hole 32d. Accordingly, the busbar unit 90 can be accurately positioned with respect to the compartmental wall 32a.

Moreover, in the flat-surface region of the through-hole 32d of the compartmental wall 32a, the through-hole 91c and the projecting portion 91b may be disposed to be aligned in a direction orthogonal to the axial direction Z. In this configuration, the through-hole 91c penetrates, in the axial direction Z, a portion of the base portion 91a where the projecting portion 91b is not arranged. A shape of an outer circumferential edge of the projecting portion 91b is not identical with a shape of an opening portion of the through-hole 32d. Even in this case, a plurality of side surfaces of the projecting portion 91b and a plurality of inner wall surfaces of the through-hole 32d are disposed to come into contact with each other or to approach each other, and thereby the position of the busbar holder 91 with respect to the compartmental wall 32a can be determined.

In the embodiment, the through-hole 91c of the busbar holder 91 is positioned in the through-hole 32d of the compartmental wall 32a. Hence, the end portion 92b of the busbar 92 at the other side projects into the through-hole 32d from the side surface of the projecting portion 91b and is connected to the coil 43a in the through-hole 32d. In other words, a connection portion of the busbar 92 and the coil 43a of the stator 43 is positioned inside the through-hole 32d.

According to this configuration, the connection portion of the busbar 92 and the coil 43a of the stator 43 is difficult to project toward the upper side or the lower side of the through-hole 32d, and thus the busbar 92 can be installed while a thickness of the electric actuator in the axial direction is inhibited from increasing.

In the embodiment, as illustrated in FIG. 5, the busbar 92 is positioned in the flat-surface region of the through-hole 32d of the compartmental wall 32a when viewed in the axial direction Z. In the embodiment, the busbar 92 is positioned at the inner side from the outer circumferential edge of the projecting portion 91b that holds the busbar 92. According to this configuration, the busbar 92 is disposed at a position which does not overlap the compartmental wall 32a when viewed in the axial direction Z, and thus a thickness of the busbar holder 91 disposed on the compartmental wall 32a can be reduced.

In the embodiment, the busbar holder 91 is disposed in contact with the top surface (surface directed toward the one side in the axial direction) of the compartmental wall 32a. According to this configuration, the busbar holder 91 is disposed at a side opposite to the motor portion 40 with the compartmental wall 32a interposed therebetween. Accordingly, since assembling of the motor portion 40 and assembling of the busbar holder 91 are individually performed, assembling work is not complicated, and workability improves.

Figure 2:
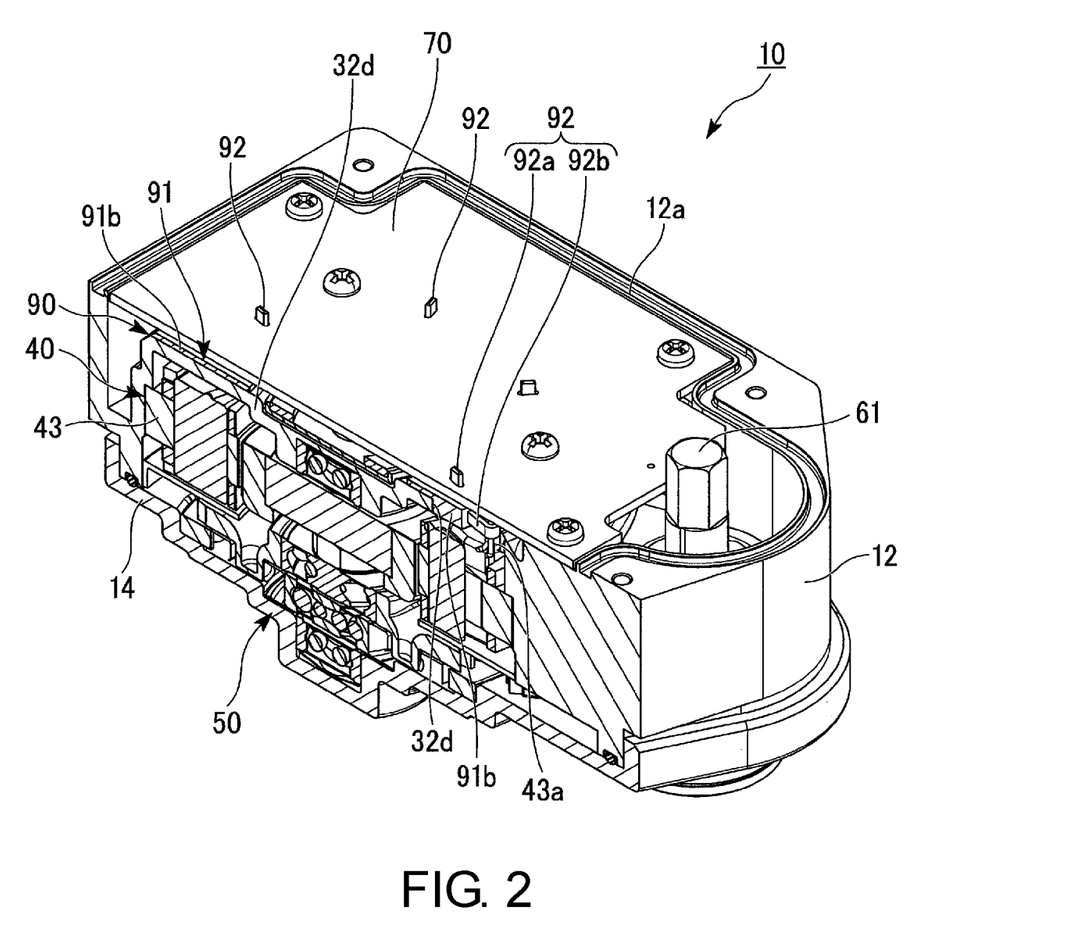
FIG. 2 is a perspective view of the electric actuator including a partial cross-section.
Figure 3:
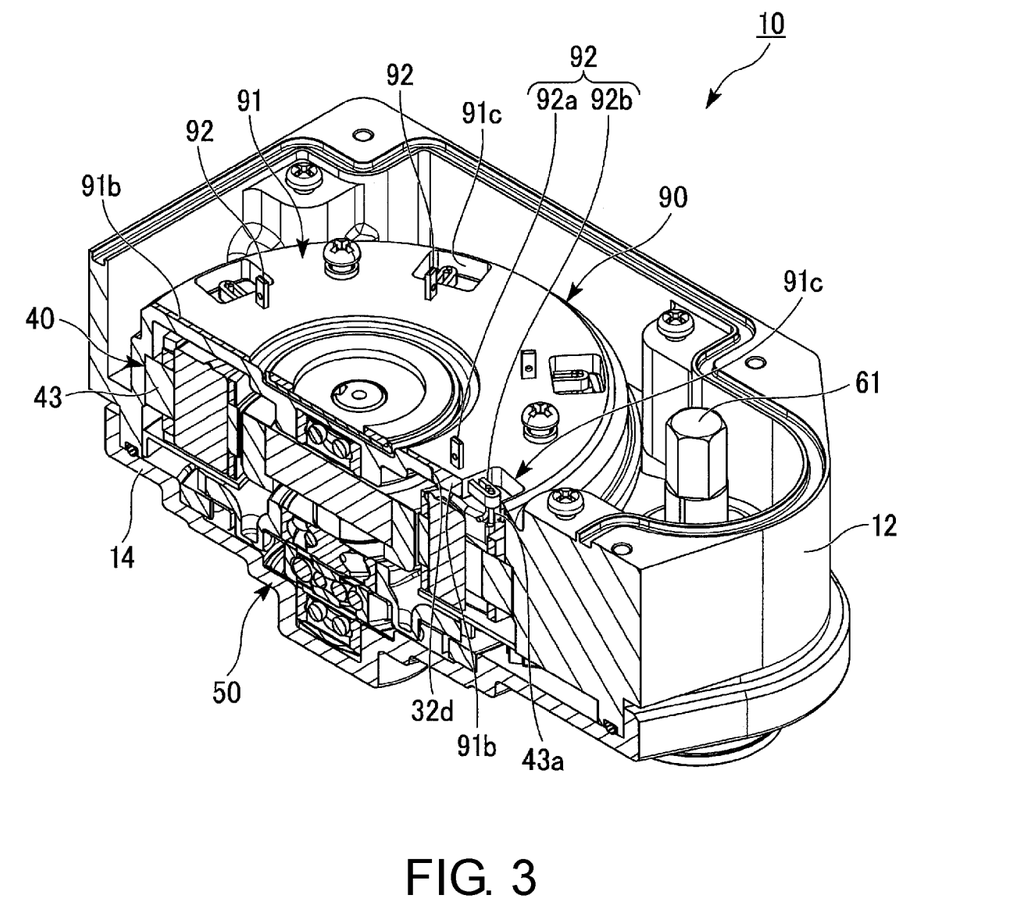
FIG. 3 is a perspective view of the electric actuator including a partial cross-section.

As illustrated in FIGS. 1 and 2, the circuit board 70 is accommodated in the opening portion 12a of the housing body 12 at the upper side. The first lid member 13 which covers the circuit board 70 from above is attached to the opening portion 12a. The housing body 12 and the first lid member 13 have a pentagonal shape when viewed in the axial direction Z. The circuit board 70 is disposed at an inner side of the opening portion 12a. In the embodiment, as illustrated in FIGS. 1 and 5, the circuit board 70 is fastened to the compartmental wall 32a of the motor case 32 by three bolts 96 positioned at a central portion when viewed in the axial direction Z. The bolts 96 penetrate the circuit board 70 and the busbar holder 91 in the axial direction and are fastened into screw bores of the compartmental wall 32a. According to this configuration, the circuit board 70 and the busbar holder 91 are fastened together by common bolts 96 and are integrated. Accordingly, it is possible to inhibit a space between the circuit board 70 and the busbar holder 91 in the up-down direction from changing due to vibration during an operation. As a result, a load can be inhibited from being applied to a connection portion of the busbar 92 and the circuit board 70.

In addition, in the embodiment, the space between the busbar holder 91 and the circuit board 70 in the axial direction Z can be reduced compared with a case in which the busbar holder 91 and the circuit board 70 are fixed to the compartmental wall 32a by using independent bolts. Hence, the electric actuator 10 can be inhibited from increasing in size due to arrangement of the busbar holder 91.

The first lid member 13 is a metal member having a container shape which is open at the lower side. The first lid member 13 and the housing body 12 are fastened by a plurality of bolts which penetrate the first lid member 13 in the axial direction. As illustrated in FIG. 1, the first lid member 13 has a frame-shaped flat portion 13a extending along the opening portion 12a of the housing body 12 and a recessed accommodation portion 13b which is positioned at an inner side of the flat portion 13a and is open toward the lower side. In the case of the embodiment, the first lid member 13 is made of sheet metal, and a top surface of the first lid member 13 at a portion where the recessed accommodation portion 13b is arranged projects toward the upper side above the flat portion 13a. By arranging the recessed accommodation portion 13b, stiffness of the first lid member 13 increases.

The recessed accommodation portion 13b accommodates an electronic component which is mounted on a top surface of the circuit board 70 and the operation portion OP of the driving-target shaft DS. For example, the recessed accommodation portion 13b accommodates a capacitor, a transistor, or the like which is mounted on the circuit board 70.

The first lid member 13 has an opening portion 13c that is positioned at the upper side of the output shaft 61. A detachable cap 15 is attached to the opening portion 13c. The cap 15 is made of rubber for example. By detaching the cap 15, a tool can be connected to the operation portion OP via the opening portion 13c.

As illustrated in FIG. 5, the electric actuator 10 includes a connector portion 81 that projects outward from a side surface of the housing body 12. The connector portion 81 is a portion to which an external device is connected. The external device is, for example, a power supply device or the like which supplies a power source to the motor portion 40. The connector portion 81 projects further outward from the housing 11 when viewed in the axial direction Z. The connector portion 81 has a tubular shape which is open at a side of a front end extending outward in the radial direction from the housing 11.

The speed reduction mechanism 50 is disposed at a position at which the motor case 32 is open downward. The second lid member 14 covers the speed reduction mechanism 50 from the lower side. In the embodiment, the second lid portion 14 is made of metal. The second lid member 14 has an inner tubular portion 14a having a cylindrical shape centered on the central axis J1, an outer tubular portion 14b having an angled-tubular shape centered on the central axis J1, a fixed tubular portion 14c which is fixed to the housing body 12, a bottom wall portion 14d which is positioned at a lower end portion of the inner tubular portion 14a, and an opening portion 14e which overlaps the output portion 60 in the axial direction Z.

The inner tubular portion 14a has an inner diameter smaller than that of the outer tubular portion 14b and is positioned at a lower side of the outer tubular portion 14b. The first bearing 44a is held at the inner side of the inner tubular portion 14a in the radial direction. Hence, the motor shaft 41 is supported rotatably around an axis by the first bearing 44a which is held by the second lid member 14 and the second bearing 44b which is held by the motor case 32.

A precompression member 47 is disposed between the first bearing 44a and the bottom wall portion 14d in the axial direction Z. In other words, the electric actuator 10 includes the precompression member 47. The precompression member 47 is a wave washer having an annular shape extending along the circumferential direction. The precompression member 47 comes into contact with an upper surface of the bottom wall portion 14d and a lower end portion of an outer ring of the first bearing 44a. The precompression member 47 applies upward precompression to the outer ring of the first bearing 44a.

The internal gear 52 is held at an inner side of the outer tubular portion 14b in the radial direction. Accordingly, the speed reduction mechanism 50 is held at a bottom portion of the housing 11 via the second lid member 14. The fixed tubular portion 14c is fixed to an outer circumferential surface of the cylindrical wall 31a of the housing body 12. Accordingly, the second lid member 14 is fixed to the housing body 12.

The output-shaft holder 33 has a cylindrical shape extending along the axial direction Z. A part of the side surface of the output-shaft holder 33 is fixed to a side surface of the motor case 32. A lower end of the output-shaft holder 33 is fixed to the bottom wall portion 31. The output-shaft holder 33 has a through-hole 33a which penetrates the output-shaft holder 33 in the axial direction Z. A bush 65 having a cylindrical shape is fitted to the inner side of the through-hole 33a.

The bush 65 has, at a lower end portion, a flange portion projecting outward in the radial direction with the output central axis J3 as a center. The flange portion of the bush 65 is supported from the lower side by a top surface of the drive gear 62. The output shaft 61 is fitted to the inner side of the bush 65. The bush 65 supports the output shaft 61 so that the output shaft 61 is capable of rotating around the output central axis J3. The output shaft 61 has a flange portion 61b expanding outward in the radial direction from the outer circumferential surface of the output shaft 61. The flange portion 61b is supported by the second lid member 14 from the lower side. A lower end portion of the output shaft 61 is exposed at the lower side through the opening portion 14e of the second lid member 14.

The use of the electric actuator of the embodiment described above is not particularly limited and may be mounted on an apparatus other than a vehicle. In addition, the configurations described above can be appropriately combined within a range in which the configurations are compatible with each other.

What is claimed is:

1. An electric actuator comprising:
   a motor portion having a motor shaft which extends in an axial direction and a stator which is disposed at an outer side in a radial direction from the motor shaft;
   a circuit board that is positioned at one side in the axial direction of the motor portion;
   a speed reduction mechanism that is coupled to the other side of the motor shaft in the axial direction;
   a busbar that electrically connects the stator and the circuit board to each other;
   a busbar holder that holds the busbar; and
   a housing that accommodates the motor portion, the speed reduction mechanism, the circuit board, the busbar, and the busbar holder,
   wherein the housing has
      a motor case that accommodates the stator in a tubular part which extends in the axial direction, and
      a compartmental wall which is positioned between the motor case and the circuit board and expands in a direction intersecting with the axial direction,
   wherein the compartmental wall has a through-hole which penetrates the compartmental wall in the axial direction,
   wherein the busbar holder has
      a base portion being plate-shaped which expands in a direction intersecting with the axial direction, and
      a projecting portion which projects from the base portion in the axial direction and is disposed in the through-hole,
   wherein an end portion of the busbar at one side projects from the busbar holder toward the one side in the axial direction and is connected to the circuit board, and
   wherein an end portion of the busbar at the other side projects into the through-hole from a side surface of the projecting portion of the busbar holder and is connected to a coil of the stator,
   wherein a connection portion of the busbar and the coil of the stator is positioned inside the through-hole.

2. The electric actuator according to claim 1, wherein the busbar is positioned in a flat-surface region of the through-hole when viewed in the axial direction.

3. The electric actuator according to claim 1, wherein the compartmental wall expands inward in the radial direction from an end portion of the motor case at the one side in the axial direction and holds a bearing which supports the motor shaft.

4. The electric actuator according to claim 1, wherein the busbar holder is disposed to come into contact with a surface of the compartmental wall, the surface being directed toward the one side in the axial direction.

5. The electric actuator according to claim 4, comprising a bolt which penetrates the circuit board and the busbar holder in the axial direction and is fastened to the compartmental wall.

* * * * *